W. F. STEARNS.
VULCANIZING APPARATUS.
APPLICATION FILED OCT. 12, 1914.
1,154,737.
Patented Sept. 28, 1915.
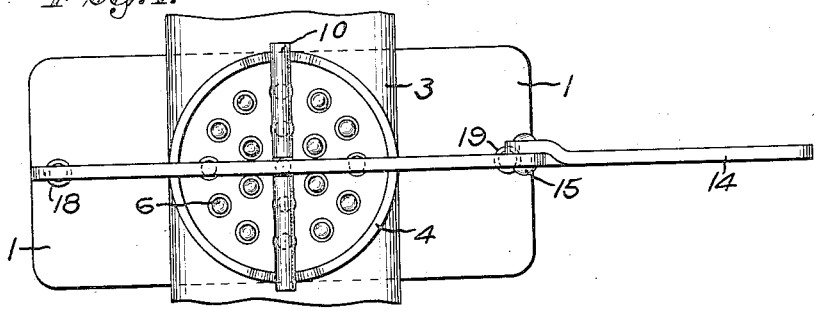
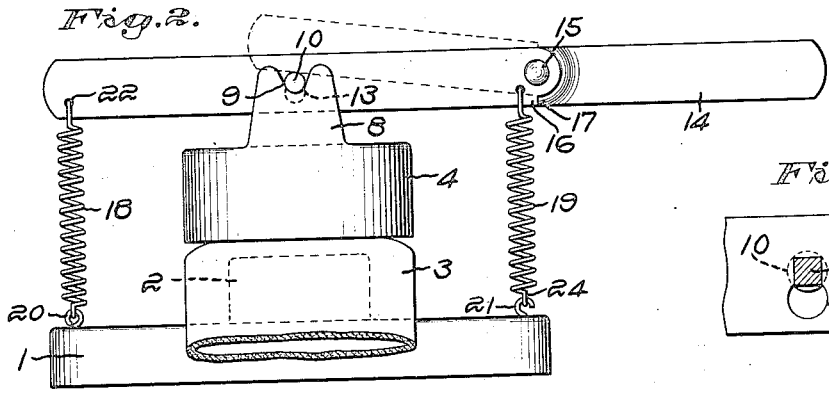
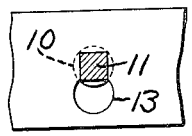
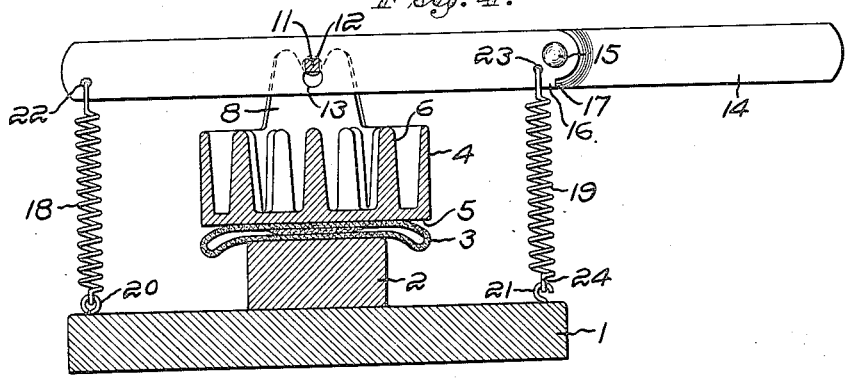
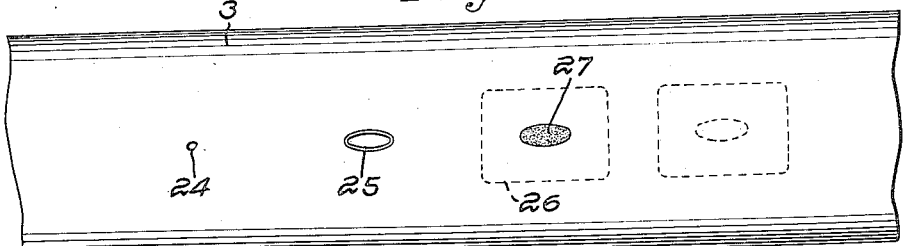
Witnesses:
Carl L. Choate.
Llewellyn Richards.
Inventor:
William F. Stearns,
by Emery, Booth, Janney and Varney
Att'ys

UNITED STATES PATENT OFFICE.

WILLIAM F. STEARNS, OF EXETER, NEW HAMPSHIRE.

VULCANIZING APPARATUS.

1,154,737.  Specification of Letters Patent. Patented Sept. 28, 1915.

Application filed October 12, 1914. Serial No. 866,271.

*To all whom it may concern:*

Be it known that I, WILLIAM F. STEARNS, a citizen of the United States, and a resident of Exeter, in the county of Rocking-ham and State of New Hampshire, have invented an Improvement in Vulcanizing Apparatus, of which the following description, in connection with the accompanying drawings, is a specification, like characters on the drawings representing like parts.

This invention relates to vulcanizing apparatus and particularly to vulcanizing apparatus of a readily portable type for repairing punctures in automobile or like tires and tubes therefor.

In order that the principle of the invention may be readily understood, I have disclosed a single embodiment thereof in the accompanying drawing, wherein—
Figure 1 is a plan view of a vulcanizing apparatus embodying my invention; Fig. 2 is a side elevation thereof; Fig. 3 is a detail in section representing the preferred manner of connecting certain of the parts of the apparatus; Fig. 4 is a view, mainly in vertical section, of the apparatus shown in Figs. 1 and 2; and Fig. 5 is a plan view of a portion of an automobile tire tube illustrating the preferred method practised by me for repairing punctures therein.

An important object of my invention is to provide an improved vulcanizing apparatus, which is readily portable, and which while it is of general application is peculiarly adapted for repairing punctures and other injuries in automobile tires and tubes therefor. My invention is, however, applicable for use in vulcanizing many different articles manufactured from rubber or rubber compound, such, for example, as rubber boots, hot water bottles, fire hose and the like. Devices of this sort have been proposed but have not in use proved satisfactory, in that among other reasons the pressure exerted thereby upon the parts to be vulcanized together has not been uniform throughout the area to be repaired, and in that the full and effective pressure is lost during vulcanization, owing to the flow of the raw material between the vulcanizing members.

A further important object of my invention is to provide a portable tire and tube vulcanizing apparatus wherein the pressure may be equalized throughout the area to be repaired and whereby the pressure may be kept even and preferably at a maximum notwithstanding the flow of the raw material.

Referring more particularly to the drawing, the body portion of the anvil or abutment member is represented at 1, it being of any suitable material and construction, and preferably provided with a block-like portion 2 whereon the tire 3 or other part to be vulcanized is laid. Said block-like portion is here shown as separate from and resting upon the abutment body member, so that it may be replaced when necessary. Said block like portion 2 is removable and replaceable. It may therefore be of different material from the body portion 1. It is preferably of less width than the tire or other article to be vulcanized, thereby to prevent undue crossing of the opposite edges of such article. The abutment opposing member is, in this form of my invention, composed of a suitable heating member 4, preferably metallic, and formed as a cup or receptacle for the reception of gasolene or other liquid to be ignited. The said member is here represented as having a flat, under surface 5 and projecting integral pins 6 to receive heat from the burning liquid and to convey it readily to the face 5 thereof. Any suitable construction may be employed for the purpose of conveying heat to the base of said member.

I provide suitable means for forcing the abutment opposing member 4 toward the anvil or abutment member 2. Preferably for this purpose I provide a lever 7 which is pivotally supported upon ears 8 rising from and preferably integral with the opposite side walls of the member 4. I have here represented the said ears as having opposite recesses 9 in their upper edges for the reception of a pivotal pin 10 carried by the lever 7.

In order that the vulcanizing apparatus may be packed in small space and may be readily transported, I preferably make the pivotal pin 10 readily detachable from the lever 7, but so construct said pin and lever that when the parts are assembled, the pin is automatically forced into its operative position. As shown most clearly in Fig. 1, the pin 10 is preferably cylindrical throughout the greater portion of its length. Substantially midlength thereof it is provided with a squared portion 11 which is adapted to fit with sufficient tightness in a similarly shaped opening 12 in the lever 10. In order to permit the insertion of the pin the lever 7 is provided with a circular opening 13 of slightly larger diameter than that of the pin 10. In assembling the parts, the pin is inserted through the opening 13 and when the squared portion 12 of the pin 10 reaches said opening 13, the lever 7 is at once automatically drawn or dropped downwardly, thus causing the pin 10 to seat itself tightly in the squared opening 12 of the lever. Such construction need not, however, be employed, as the pin may be wholly cylindrical.

In order further to insure compactness of structure, the lever 7 is preferably of variable length. I have herein represented it as having a folding portion 14 hinged at 15 to the body portion. The body portion 7 and the hinged portion 14 are shown as provided with shoulders 16, 17 adapted to meet, as indicated in Figs. 2 and 3, thereby limiting the downward movement of the folding member of the lever. This hinged construction need not, however, be employed in all embodiments of my invention.

In order that pressure may be equally applied throughout the entire area to be repaired and also in order that the proper pressure may be maintained upon the parts notwithstanding any flow of the raw material or yielding thereof, I preferably connect the lever 7 to the anvil or abutment member 1 by means compensating for such flow or yield. Preferably I employ spring means for this purpose. I have herein represented two springs 18 and 19 each adapted to be connected by screw eyes 20, 21 to said anvil or abutment member. Preferably the spring 18 is permanently connected to the screw eye 20 and is also permanently connected to the lever 7, as by passing the bent end of the spring through an eye 22 thereof. Preferably the coiled spring 19 is permanently connected to the lever 7, as by inserting the bent end thereof in the hole 23 in the lever 7, the opposite bent end 24 of said spring being adapted to be detachably connected to the hook or partial screw eye 21 after the tire tube or other article to be vulcanized is positioned between the anvil or abutment member and the anvil opposing or heating member 4.

In Fig. 5, I have represented an automobile tire tube 3 as having therein a puncture 24. In repairing such a puncture, I preferably proceed as follows: The puncture opening is enlarged by cutting away the surrounding portion of the rubber, as indicated at 25 in said figure. In order to prevent adherence of the opposite walls or portions of the tire tube, I preferably apply some powder or like substance thereto, such, for example, as soapstone or talc. This may be applied by inserting such material through the opening, and if desired the tire tube may be held in such position that the powder or other substance reaches all the parts at the damaged area that are subjected to pressure during the vulcanizing operation. Thereupon, the inner surface of the tube adjacent to or surrounding the opening 25 and the walls of the latter are cleansed, as by application of gasolene in any suitable manner. This is preferably done by cloth. The vulcanizing cement or other adhesive is now applied to the inner surface of the tire tube surrounding the said opening. Having thus prepared the tire tube, a suitable repair piece 26 of vulcanizing material, and preferably a rubber-containing composition of sufficient area, is treated with soap-stone, talc or other suitable material on one side and is then folded and grasped by a suitable tool, such as a pair of pliers. While so held, it is smeared with gasolene, so as to allow it readily to slip through the cemented opening 25. It is then released and permitted to assume the position indicated in Figs. 4 and 5. Thereupon a suitable piece of vulcanizing and preferably rubber-containing material 27 corresponding in area to the hole 25 is prepared and inserted in said opening, so that it contacts with the inserted piece 26. The upper face of said inserted piece 27 is preferably substantially flush with the outer surface of the tire tube 3.

The tire tube is now in condition to be vulcanized and is placed upon the anvil or abutment member 1, as indicated in Fig. 4. If desired, a cloth or other suitable material dusted with soap-stone is then placed upon the tire tube, to protect the latter and prevent adherence of the abutment opposing member 4 thereto. The heating or abutment opposing member 4 is then placed in position, as indicated in said figure, the pin 10 (if a removable pin be employed) is inserted in the lever 7 and seated upon the ears 8 of the said heating or abutment opposing member 4. The spring 19 is now connected to the hook or partial eye 21. In this position of the parts, pressure is equally applied by the springs 18 and 19 to all parts of the tire tube that are to be vulcanized together. Gasolene or other suitable liquid is now poured into the cup-like member 4 and ignited. The heat thereby imparted to the said member 4 effects vulcanization, and as the vulcanization proceeds and the raw material flows or yields, the springs 18, 19 automatically draw lever 7 toward the anvil or abutment member 1, 2, and hence maintain an effective, continuous pressure upon the tire tube during the entire vulcanization. So far as I am aware, I am the first to provide means for elastically compensating for the flow or yield of the raw material during vulcanization. This I preferably effect by spring means of any suitable construction.

Having thus described one illustrative embodiment of my invention, I desire it to be understood that although specific terms are employed, they are used in a generic and descriptive sense and not for purposes of limitation, the scope of the invention being set forth in the following claims.

Claims:

1. A vulcanizing device complete in itself, comprising an anvil or abutment member constructed and arranged to receive the article to be vulcanized and constituting a permanent part of said device, an abutment opposing member having an open cup adapted to receive the vulcanizing, heat-supplying liquid, and spring-means connecting said members together in operation, thereby effecting continuous spring-pressure upon the article to be vulcanized throughout the vulcanizing area and action, said pressure means constituting a permanent connection between said abutment member and abutment opposing member.

2. A vulcanizing device complete in itself, comprising an anvil or abutment member constructed and arranged to receive the article to be vulcanized, an abutment opposing member, having an open cup adapted to receive the vulcanizing, heat-supplying liquid, and spring-means connecting said members together in operation, thereby effecting continuous spring-pressure upon the article to be vulcanized throughout the vulcanizing area and action.

3. A vulcanizing apparatus comprising in combination an anvil or abutment member, an abutment opposing member, at least one of said members having provision for heating the same, a lever mounted for rocking movement upon one of said members, said lever having arms extending oppositely from its pivot, and means for connecting each of said arms directly to the other member and thereby to apply pressure thereto whereby through said pressure lever the pressure may be equalized.

4. A vulcanizing apparatus comprising in combination an anvil or abutment member, an abutment opposing member, at least one of said members having provision for heating the same, a lever mounted upon one of said members and having arms extending oppositely from its pivot, and springs connecting each of said arms directly to the other member, thereby to apply continuous spring pressure thereto during the vulcanizing operation.

5. Vulcanizing apparatus comprising in combination, an anvil or abutment member, a heating member formed as a cup having heat-conveying projections, and spring means connecting said members to compress the work therebetween.

6. Vulcanizing apparatus comprising in combination, an anvil or abutment member, a heating member formed as a cup, constituting a heating liquid receptacle, a lever mounted upon said member and means to connect said lever and anvil or abutment member.

7. Vulcanizing apparatus comprising in combination, an anvil or abutment member, a heating member formed as a cup, a lever mounted thereon, and spring means yieldingly to connect said lever and abutment or anvil member.

8. Vulcanizing apparatus comprising in combination, an anvil or abutment member, an abutment opposing member, a lever connected to one of said members and a pivotal pin extending from the other, said lever and pin being separable but formed to automatically interengage upon positioning the parts.

9. Vulcanizing apparatus comprising in combination, an anvil or abutment member, an abutment opposing member formed as an open member adapted to have a combustible heating liquid deposited therein, and means including a lever of variable length for connecting said members.

10. Vulcanizing apparatus comprising in combination, an anvil or abutment member, an abutment opposing member, and means including a lever having a holding portion for connecting said members.

11. Vulcanizing apparatus comprising in combination, an anvil or abutment member, an abutment opposing member, a lever connected to one of said members and having a readily removable, pivotal pin, and means for supporting said pin upon the other member.

12. A vulcanizing device complete in itself comprising an anvil or abutment member 1 having a removable and replaceable block 2 positionable thereon and adapted to receive the article to be vulcanized and to support it above said member 1, an abutment opposing member having an open cup adapted to receive the vulcanizing, heat-supplying liquid, said block being of materially less width than said cup, whereby undue pressure upon the folded edges of a tire or tire tube is prevented, means mounted upon said cup and spring means permanently connecting said means and the abutment member together in operation, thereby to apply pressure to the interposed article to be vulcanized.

13. Vulcanizing apparatus comprising in combination, an anvil or abutment member, an abutment opposing member, a lever connected to one of said members and having a readily removable, pivotal pin, said pin being also readily removable from the other member.

In testimony whereof, I have signed my name to this specification, in the presence of two subscribing witnesses.

WILLIAM F. STEARNS.

Witnesses:
IRVING U. TOWNSEND,
ROBERT H. KAMMLER.